(12) United States Patent
Adams et al.

(10) Patent No.: US 6,932,883 B2
(45) Date of Patent: Aug. 23, 2005

(54) SCREENS FOR VIBRATORY SEPARATORS

(75) Inventors: Thomas C. Adams, Hockley, TX (US); Kerry Ward, Cypress, TX (US); Kenneth W. Seyffert, Houston, TX (US); David L. Schulte, Jr., Broussard, LA (US); Charles N. Gricher, Houston, TX (US); Vincent D. Leone, Houston, TX (US); Jefrey E. Walker, Lafayette, LA (US); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 544 days.

(21) Appl. No.: 10/210,891

(22) Filed: Jul. 31, 2002

(65) Prior Publication Data

US 2003/0010437 A1 Jan. 16, 2003

Related U.S. Application Data

(63) Continuation-in-part of application No. 10/037,474, filed on Oct. 19, 2001, now Pat. No. 6,669,985, which is a continuation-in-part of application No. 09/603,531, filed on Jun. 27, 2000, now Pat. No. 6,450,345, which is a continuation-in-part of application No. 09/517,212, filed on Mar. 2, 2000, now Pat. No. 6,565,698, which is a continuation-in-part of application No. 09/454,722, filed on Dec. 4, 1999, now abandoned, which is a continuation-in-part of application No. 09/390,231, filed on Sep. 3, 1999, now Pat. No. 6,325,216, and a continuation-in-part of application No. 09/707,277, filed on Nov. 6, 2000, now Pat. No. 6,581,781, which is a continuation-in-part of application No. 09/183,004, filed on Oct. 30, 1998, now Pat. No. 6,186,337.

(51) Int. Cl.⁷ ............................................... B32B 31/26
(52) U.S. Cl. ...................... 156/320; 156/291; 156/322; 209/319; 209/403; 209/405
(58) Field of Search ............................. 210/493.5, 499, 210/155, 488–489, 490–492, 493.1, 493.3; 156/290–291, 320, 322, 583.1, 583.3; 209/311, 313, 315, 319, 331, 333, 401–402, 403, 405

(56) References Cited

U.S. PATENT DOCUMENTS

| 40,242 A | 10/1863 | Capell |
| 236,416 A | 1/1881 | Bourne |

(Continued)

FOREIGN PATENT DOCUMENTS

| DE | 199 31 258 A1 | 1/1998 |
| EP | 0 169698 | 1/1986 |

(Continued)

OTHER PUBLICATIONS

OEM Oilfield Pretensioned Screens, Fluid Systems Inc., 2001.

(Continued)

Primary Examiner—Jessica L. Rossi
(74) Attorney, Agent, or Firm—Guy McClung

(57) ABSTRACT

A method for making a screen assembly for a vibratory separator, the method including, in at least certain aspects, gluing together with glue at least two layers of fine screening material, allowing the glue to set, preheating the glued together at least two layers of fine screening material, placing the thus-preheated at least two layers of fine screening material in a heating apparatus, placing a coarse mesh layer on the at least two layers of screening material on the heating apparatus, placing on the coarse mesh layer a support with heat activated material thereon for adhering the support to the coarse mesh layer, and heating the coarse mesh layer, at least two fine layers of fine screening material, and the support to adhere the support to the coarse mesh layer and to glue the at least two layers of fine screening material to the coarse mesh layer.

18 Claims, 9 Drawing Sheets

U.S. PATENT DOCUMENTS

| | | |
|---|---|---|
| 246,144 A | 8/1881 | Keeler |
| 268,491 A | 12/1882 | Hubbell |
| 275,190 A | 4/1883 | Gilbert |
| 275,340 A | 4/1883 | Kimball |
| 500,302 A | 5/1893 | Stoecket et al. |
| 516,673 A | 3/1894 | Wilson |
| 526,562 A | 9/1894 | Cross |
| 560,858 A | 5/1896 | Missroon |
| 583,981 A | 6/1897 | Plaisted |
| 607,598 A | 7/1898 | Closz |
| 777,317 A | 12/1904 | Traylor |
| 865,185 A | 9/1907 | Kerrigan |
| 948,222 A | 2/1910 | Honabach |
| 966,578 A | 8/1910 | Murphy et al. ......... 209/401 X |
| 984,866 A | 2/1911 | Tate |
| 1,098,979 A | 6/1914 | Schuchard |
| 1,132,667 A | 3/1915 | Milliot |
| 1,139,041 A | 5/1915 | Larson |
| 1,242,982 A | 10/1917 | Reynolds |
| 1,248,081 A | 11/1917 | Couch |
| 1,250,768 A | 12/1917 | Baumgartner ............... 209/392 |
| 1,344,747 A | 6/1920 | Wright |
| 1,397,339 A | 11/1921 | Turtevant |
| 1,423,021 A | 7/1922 | Reynolds |
| 1,462,804 A | 7/1923 | Evans |
| 1,505,735 A | 8/1924 | Stebbins |
| 1,561,632 A | 11/1925 | Woodward |
| 1,626,774 A | 5/1927 | Allan |
| 1,614,586 A | 10/1927 | Anderson et al. |
| 1,678,941 A | 7/1928 | Helman |
| 1,713,143 A | 5/1929 | Overstrom |
| 1,716,758 A | 6/1929 | Bland |
| 1,785,195 A | 12/1930 | Hoes et al. |
| 1,879,377 A | 9/1932 | McNeely |
| 1,947,307 A | 2/1934 | Rafton |
| 1,950,861 A | 3/1934 | O'Toole, Sr. |
| 1,997,713 A | 4/1935 | Boehm |
| 1,997,740 A | 4/1935 | Nickerson |
| 2,052,467 A | 8/1936 | Hermann .................... 209/401 |
| 2,061,850 A | 11/1936 | Roberts |
| 2,082,513 A | 6/1937 | Roberts |
| 2,089,548 A | 8/1937 | Frantz et al. |
| 2,104,785 A | 1/1938 | Akeyston ................... 210/384 |
| 2,190,262 A | 2/1940 | Geist |
| 2,251,909 A | 8/1941 | Linsay ....................... 210/149 |
| 2,274,700 A | 3/1942 | Jenks |
| 2,335,084 A | 11/1943 | Rice ........................... 209/408 |
| 2,406,051 A | 8/1946 | Weiss |
| 2,462,878 A | 3/1949 | Logue |
| 2,480,320 A | 8/1949 | Carrier ....................... 210/388 |
| 2,511,239 A | 6/1950 | Behnke et al. ............. 209/403 |
| 2,648,441 A | 8/1953 | Soldan |
| 2,667,975 A | 2/1954 | Seaholm ..................... 210/152 |
| 2,670,079 A | 2/1954 | Betts .......................... 209/405 |
| 2,677,462 A | 5/1954 | Conkling .................... 209/403 |
| 2,723,032 A | 11/1955 | Gisler et al. |
| 2,726,184 A | 12/1955 | Cox et al. |
| 2,774,477 A | 12/1956 | Pollitz ........................ 209/403 |
| 2,800,227 A | 7/1957 | Kiger .................... 209/412 X |
| 2,813,629 A | 11/1957 | Brugmann ................. 209/403 |
| 2,827,169 A | 3/1958 | Cusi |
| 2,902,165 A | 9/1959 | Imershein |
| 2,929,464 A | 3/1960 | Sprouse |
| 2,973,865 A | 3/1961 | Cibula .................... 209/392 X |
| 2,980,208 A | 4/1961 | Neumann |
| 2,985,303 A | 5/1961 | Wright |
| 3,057,481 A | 10/1962 | Pale ........................... 210/493 |
| 3,070,231 A | 12/1962 | McCorkel et al. .......... 209/319 |
| 3,092,573 A | 6/1963 | Lambert et al. ............ 209/403 |
| 3,165,473 A | 1/1965 | Pall et al. ................... 210/510 |
| 3,176,843 A | 4/1965 | Hoskins et al. ............. 209/403 |
| 3,243,943 A | 4/1966 | Getzin ........................ 55/499 |
| 3,255,885 A | 6/1966 | Burls ......................... 209/314 |
| 3,285,413 A | 11/1966 | Taylor-Smith |
| 3,306,794 A | 2/1967 | Humbert, Jr. |
| 3,458,978 A | 8/1969 | Davis ......................... 55/499 |
| 3,465,413 A | 9/1969 | Rosaen et al. ............... 29/428 |
| 3,542,636 A | 11/1970 | Wandel |
| 3,574,103 A | 4/1971 | Latkin ........................ 428/72 |
| 3,655,060 A | 4/1972 | Hagdahl ..................... 210/493 |
| 3,679,057 A | 7/1972 | Perez ......................... 210/223 |
| 3,716,138 A | 2/1973 | Lumsden ................... 209/401 |
| 3,747,770 A | 7/1973 | Zentis ........................ 210/402 |
| 3,747,772 A | 7/1973 | Brown ....................... 210/493 |
| 3,789,498 A | 2/1974 | Cole .......................... 29/470.9 |
| 3,793,692 A | 2/1974 | Tate et al. ................... 29/163.5 |
| 3,853,529 A | 12/1974 | Boothe et al. ............... 55/499 |
| 3,900,628 A | 8/1975 | Stewart |
| 3,929,642 A | 12/1975 | Ennis et al. ................. 210/113 |
| 3,970,549 A | 7/1976 | Ennis et al. ................. 209/341 |
| 4,019,987 A | 4/1977 | Krashow .................... 210/232 |
| 4,022,596 A | 5/1977 | Pedersen .................... 55/528 |
| 4,033,865 A | 7/1977 | Derrick, Jr. ................. 209/275 |
| 4,062,769 A | 12/1977 | Simonson ................... 209/399 |
| 4,065,382 A | 12/1977 | Derrick, Jr. ................. 209/313 |
| 4,075,106 A | 2/1978 | Yamazaki ................... 210/487 |
| 4,138,303 A | 2/1979 | Taylor ........................ 156/264 |
| 4,224,146 A | 9/1980 | Kent et al. .................. 209/243 |
| 4,306,974 A | 12/1981 | Harry ......................... 210/388 |
| 4,375,199 A | 3/1983 | Graeme-Barber et al. .. 144/222 |
| 4,380,494 A | 4/1983 | Wilson ....................... 209/319 |
| 4,410,427 A | 10/1983 | Wydeven .................... 210/317 |
| 4,446,022 A | 5/1984 | Harry ......................... 210/388 |
| 4,457,839 A | 7/1984 | Bailey ........................ 209/234 |
| 4,464,242 A | 8/1984 | Boulton ..................... 204/253 |
| 4,472,473 A | 9/1984 | Davis et al. ................. 428/184 |
| 4,491,517 A | 1/1985 | Janovac ...................... 209/401 |
| 4,546,783 A | 10/1985 | Lott ........................... 134/109 |
| 4,575,421 A | 3/1986 | Derrick et al. .............. 209/397 |
| 4,582,597 A | 4/1986 | Huber ........................ 204/313 |
| 4,589,983 A | 5/1986 | Wydevan .................... 210/317 |
| 4,603,653 A | 8/1986 | Bews .......................... 116/209 |
| 4,617,122 A | 10/1986 | Kruse et al. ............. 210/493.3 |
| 4,634,535 A | 1/1987 | Lott ........................... 210/780 |
| 4,678,578 A | 7/1987 | Nodes et al. ................ 210/445 |
| 4,691,744 A | 9/1987 | Haver et al. ............. 139/425 R |
| 4,696,751 A | 9/1987 | Eifling ....................... 210/780 |
| 4,728,422 A | 3/1988 | Bailey ........................ 210/314 |
| 4,744,898 A | 5/1988 | Bailey ........................ 210/236 |
| 4,769,968 A | 9/1988 | Davis et al. ................. 52/814 |
| 4,819,809 A | 4/1989 | Derrick ...................... 209/275 |
| 4,820,407 A | 4/1989 | Lilie .......................... 209/397 |
| 4,832,834 A | 5/1989 | Baird, Jr. .................... 209/397 |
| 4,846,352 A | 7/1989 | Bailey ........................ 209/399 |
| 4,857,176 A | 8/1989 | Derrick et al. .............. 209/392 |
| 4,882,054 A | 11/1989 | Derrick et al. .............. 210/389 |
| 4,940,500 A | 7/1990 | Tado Koro et al. ......... 156/204 |
| 4,954,249 A | 9/1990 | Gero et al. .................. 209/273 |
| 5,028,474 A | 7/1991 | Czaplicki ................... 428/178 |
| 5,084,178 A | 1/1992 | Miller et al. ............. 210/493.5 |
| 5,116,553 A | 5/1992 | Harvey ....................... 264/39 |
| 5,137,622 A | 8/1992 | Souter ........................ 209/403 |
| 5,139,154 A | 8/1992 | Gero et al. .................. 209/273 |
| 5,162,143 A | 11/1992 | Porter et al. ................ 428/179 |
| 5,167,740 A | 12/1992 | Michaelis et al. ........... 156/73.1 |
| 5,211,291 A | 5/1993 | Kelley et al. ................ 209/680 |
| 5,221,008 A | 6/1993 | Derrick, Jr. et al. ........ 209/269 |
| 5,240,479 A | 8/1993 | Bachinski .................. 55/103 |
| 5,256,291 A | 10/1993 | Cagle ......................... 210/499 |
| 5,256,292 A | 10/1993 | Cagle ......................... 210/499 |
| 5,312,508 A | 5/1994 | Chisholm ................... 156/292 |

| | | | |
|---|---|---|---|
| 5,316,676 A | 5/1994 | Drori | 210/411 |
| 5,330,057 A | 7/1994 | Schiller et al. | 209/392 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| H1481 H | 9/1995 | Ray | 428/98 |
| 5,490,598 A | 2/1996 | Adams | 209/403 X |
| 5,614,094 A | 3/1997 | Deister et al. | 210/388 |
| 5,626,234 A | 5/1997 | Cook et al. | 209/315 |
| 5,636,749 A | 6/1997 | Wojciechowski | 209/403 |
| 5,667,661 A | 9/1997 | Hughes | 205/138 |
| 5,690,826 A * | 11/1997 | Cravello | 210/384 |
| 5,720,881 A | 2/1998 | Derrick et al. | 210/388 |
| 5,783,077 A | 7/1998 | Bakula | 210/388 |
| 5,814,218 A | 9/1998 | Cagle | 210/388 |
| 5,819,952 A | 10/1998 | Cook et al. | 209/400 |
| 5,851,393 A | 12/1998 | Carr et al. | 204/489 |
| 5,868,889 A | 2/1999 | Kahler | 156/204 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,927,511 A | 7/1999 | Riddle et al. | 209/405 |
| 5,944,197 A | 8/1999 | Batlzer et al. | 209/400 |
| 5,944,993 A | 8/1999 | Derrick et al. | 210/388 |
| 5,950,841 A | 9/1999 | Knox et al. | 209/315 |
| 5,958,236 A | 9/1999 | Bakula | 210/388 |
| 5,967,336 A | 10/1999 | Baltzer et al. | 209/403 |
| 5,984,107 A | 11/1999 | Bleh | 209/320 |
| 5,992,641 A | 11/1999 | Caldwell, Jr. | 209/273 |
| 6,000,556 A | 12/1999 | Bakula | 210/388 |
| 6,000,558 A | 12/1999 | Proulx et al. | 210/486 |
| 6,006,923 A | 12/1999 | Helmy et al. | 209/397 |
| 6,018,383 A | 1/2000 | Dunn et al. | 355/49 |
| 6,019,152 A | 2/2000 | Haynes et al. | 156/433 |
| 6,019,228 A | 2/2000 | Duggan | 209/408 |
| 6,053,331 A | 4/2000 | Cravello | 210/388 |
| 6,053,332 A | 4/2000 | Bakula | 210/388 |
| 6,186,337 B1 * | 2/2001 | Adams et al. | 209/401 |
| 6,269,954 B1 | 8/2001 | Baltzer | 209/405 |
| 6,279,644 B1 | 8/2001 | Wylie | 160/371 |
| 6,305,549 B1 | 10/2001 | Riddle et al. | 209/403 |

FOREIGN PATENT DOCUMENTS

| | | | |
|---|---|---|---|
| GB | 269877 | 4/1928 | 8794/27 |
| GB | 519680 | 7/1939 | |
| GB | 823648 | 6/1957 | |
| GB | 1412975 | 11/1975 | |
| GB | 1575312 | 9/1980 | |
| GB | 1578948 | 11/1980 | |
| GB | 2085744 | 5/1982 | |
| GB | 2124099 A | 2/1984 | |
| GB | 2161715 | 1/1986 | |
| GB | 2161715 A | 1/1986 | |
| GB | 2162091 | 1/1986 | |
| GB | 2175222 | 11/1986 | |
| GB | 2161715 B | 6/1988 | |
| GB | 2206501 | 1/1989 | |
| GB | 2312858 | 11/1997 | |
| JP | 59-142818 | 8/1984 | |
| WO | PCT/GB91/00957 | 1/1991 | |
| WO | PCT/US94/00243 | 1/1994 | |
| WO | WO 95/23655 | 3/1994 | B07B/1/46 |
| WO | PCT/EP96/03103 | 2/1996 | |

OTHER PUBLICATIONS

Black Thunder Linear Power Shaker, Fluid Systems Inc., 2002.

Composite Catalog, Derrick Equip. Co., pp. 5–10, 15–17, 2002.

Multi–Function Linear Motion Shakers, Kan–Tron Technologies, Inc., 2002.

Int'l Search Report, PCT/GB97/00385 co–owned with present application.

Offical Gazette Entry for U.S. Pat. No. 5,626,234, May 6, 1997.

The Brandt Company General Catalog 1982–1983, 4 pages, 1982.

Take the Drilled Solids Out, The Brandt Company, Sep. 1980.

Sweco Full–Flow, Sweco, Inc. 1992.

Catalog 105 H&K Perforated Materials, Harrington & King–Perforating Co., 1988.

Sweco Oilfield Services, Composite Catalog, 1992.

Screening Equipment Handbook, Pankratz, 1988.

Supertaut Mud Cleaner Screens, Sweco Oilfield Services, 1992.

Filtration & Separation, Flo Trend Systems, Inc. 1989.

Clean Liquids/Dry Solids, Flo Trend Systems, Inc. 1989.

M & K Perforated Materials, Harrington and King, Catalog 105, 1988.

An Innovative Method of ranking Shale Shaker Screens, STC05, Shale Shaker Technology Conference, Feb. 1991.

U.S. Appl. No. 08/282,983; filed Jul. 29, 1994 entitled "Shale Shaker Screens," co–owned with present invention/application.

"Derrick Sandwich Shaker," Derrick Equipment Co. (Prior to 1992).

"The Future of Fine Screening," Derrick Equipment Co. 1993.

"Derrick Pyramid Screens," Derrick Corp.

"Advanced Wirecloth, Inc.," Advanced Wirecloth, Inc., 1993.

"CPI Group, Inc.," CPI Group, Inc., 1990.

"LM3 Full–Flo Shale Shaker," Sweco Oilfield Services, 1991.

Pending U.S. Appl. No. 08/220,101 filed Mar. 30, 1994 entitled "Screen For Vibrating Separator."

Amendment Under 37 CFR 1.115 in pending U.S. Appl. No. 08/220,101.

McNally Coal Prepartion Manual M 576, pp. 111, 73–96, 216 (1978).

Layered Shale Shaker Screens Improve Mud Solids Control, World Oil, 1978.

* cited by examiner

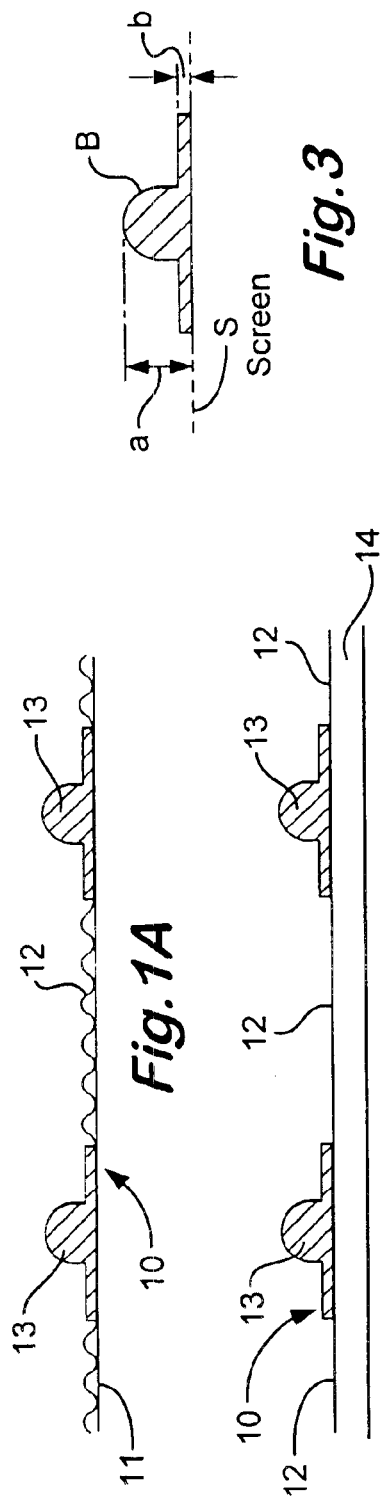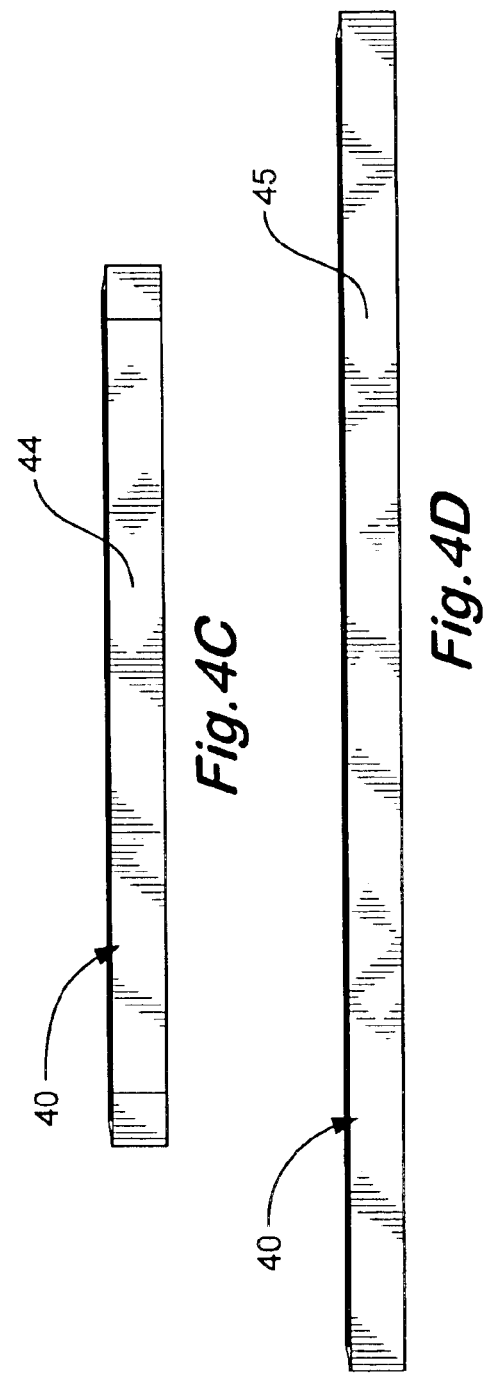

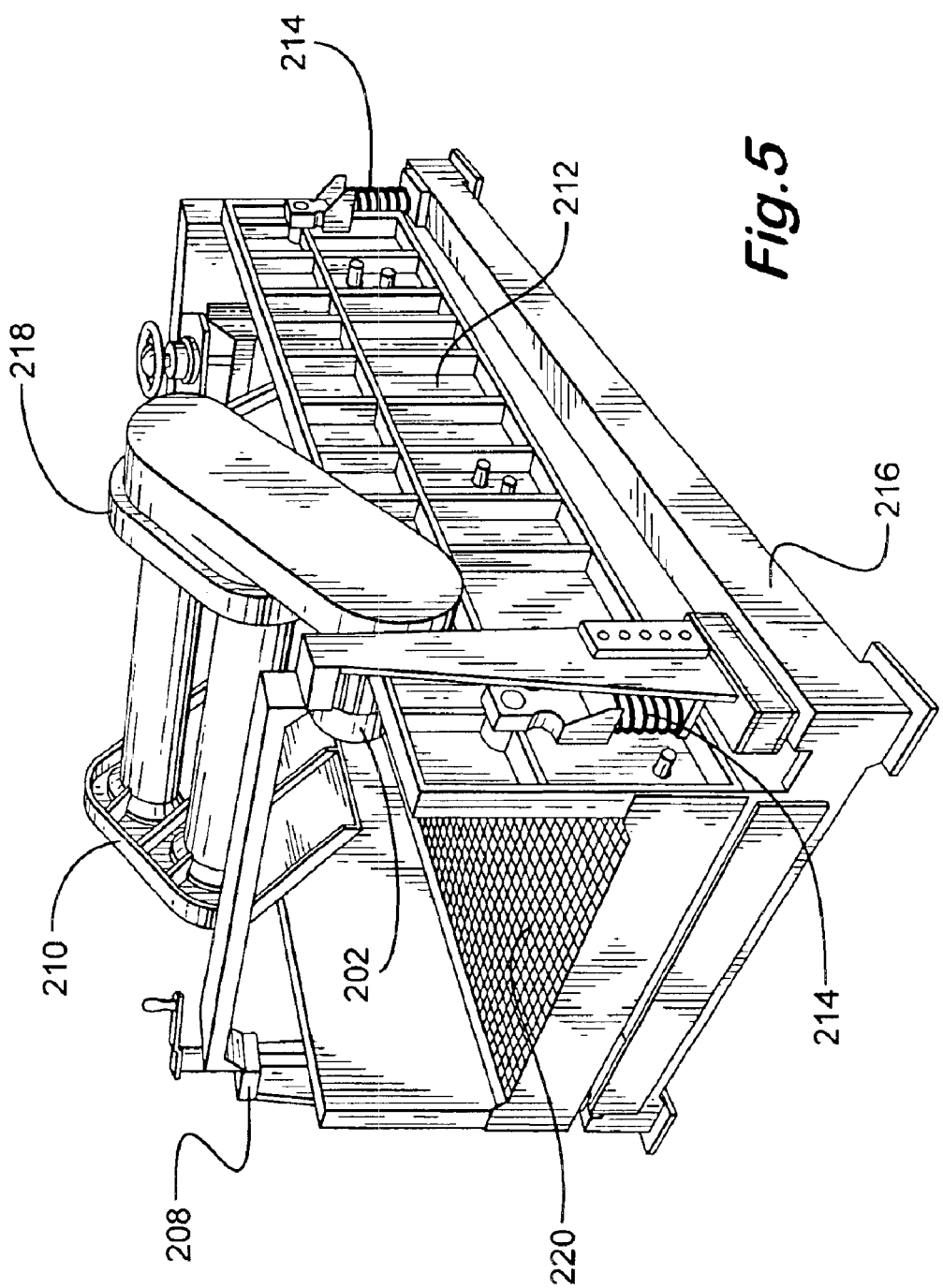

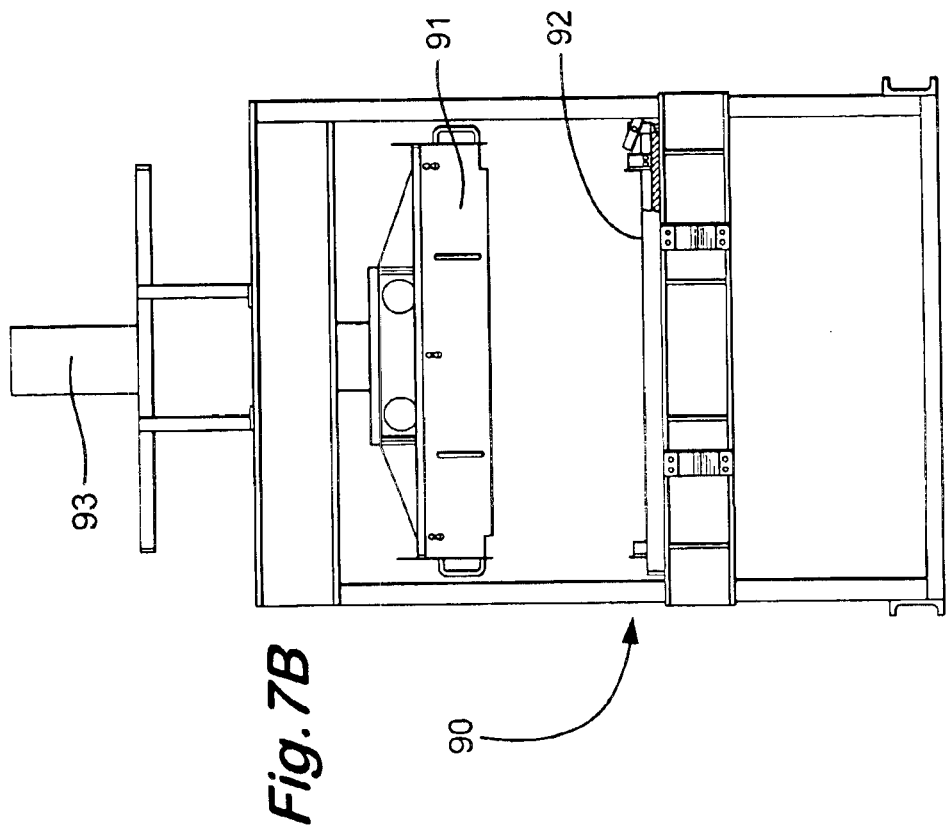
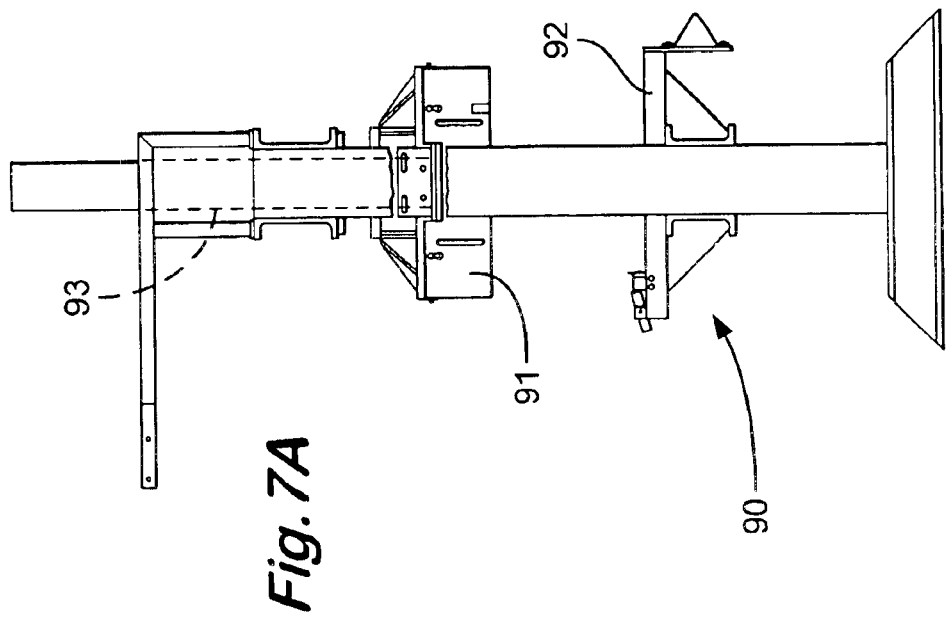

SCREENS FOR VIBRATORY SEPARATORS

RELATED APPLICATIONS

This application is a continuation-in-part of U.S. application Ser. No. 10/037,474 filed Oct. 19, 2001 now U.S. Pat. No. 6,669,985, which is a continuation-in-part of U.S. application Ser. No. 09/603,531 filed Jun. 27, 2000 now U.S. Pat. No. 6,450,345 which is a continuation-in-part of U.S. application Ser. No. 09/517,212 filed Mar. 2, 2000 now U.S. Pat. No. 6,565,698 which is a continuation-in-part of U.S. application Ser. No. 09/454,722 filed on Dec. 4, 1999 now abandoned which is a continuation-in-part of U.S. application Ser. No. 09/390,231 filed Sep. 3, 1999 now U.S. Pat. No. 6,325,216; and this application is a continuation-in-part of U.S. application Ser. No. 09/707,277 filed Nov. 6, 2000 now U.S. Pat. No. 6,581,781 which is a continuation-in-part of U.S. application Ser. No. 09/183,004 filed Oct. 30, 1998 issued as U.S. Pat. No. 6,186,337 on Feb. 13, 2001—all of which applications and patents are incorporated herein in their entirety for all purposes and with respect to all of which the present invention claims priority under the Patent Laws.

BACKGROUND OF THE INVENTION

1. Field of the Invention

The present invention is directed to glued screens for vibratory separator apparatuses and shale shakers; to methods for making such screens; and to vibratory separator apparatuses and shale shakers with such screens.

2. Description of Related Art

The prior art discloses a wide variety of vibrating screens, devices which use the, shale shakers, and screens for shale shakers. The screens catch, filter, or remove solids from fluid to be treated by a vibratory separator or shale shaker.

Certain prior art screens and screen assemblies for vibratory separators and shale shakers have areas of screening material which are improperly tensioned, including but not limited to, screen assemblies with areas of screen material surrounded by epoxy. With certain such screens, these areas of screening material are often rippled, or wavy, i.e., it is not flat and not, therefore, properly tensioned or not optimally tensioned. A variety of problems and disadvantages are associated with such screens that have areas of rippled screening material: poor conveyance of solids across a screen; reduced screen life; and increased screen cost.

SUMMARY OF THE PRESENT INVENTION

The present invention discloses, in at least certain aspects, methods for making a screen assembly for a vibratory separator, the method including gluing together with glue at least two layers of fine screening material, allowing the glue to set, preheating the glued-together at least two layers of fine screening material, placing the thus-preheated at least two layers of fine screening material in a heating apparatus, placing a coarse mesh layer on the at least two layers of screening material on the heating apparatus, placing on the coarse mesh layer a support with heat activated material thereon for adhering the support to the coarse mesh layer, and heating the coarse mesh layer, at least two layers of fine screening material, and the support to adhere the support to the coarse mesh layer and to glue the at least two layers of fine screening material to the coarse mesh layer. In certain aspects the coarse mesh layer has one or more glue lines or glue beads thereon. In certain aspects, the coarse mesh layer is preheated with the layers of fine screening material.

The present invention discloses, in at least certain aspects, methods for making a screen assembly for a vibratory separator or shale shaker, the method including gluing together with glue at least two layers of fine screening material; allowing the glue to set; preheating the glued together at least two layers of fine screening material; placing the thus-preheated at least two layers of fine screening material in a heating apparatus; placing a coarse mesh layer on the at least two layers of screening material on the heating apparatus; placing on the coarse mesh layer a support with heat activated material thereon for adhering the support to the coarse mesh layer; and heating the coarse mesh layer, at least two fine layers of fine screening material, and the support to adhere the support to the coarse mesh layer and to glue the at least two layers of fine screening material to the coarse mesh layer. In some aspects the glue is moisture-curing hot melt glue and the gluing together of the at least two layers of fine screening material glues together the coarse mesh layer and the at least two layers of fine screening material. In one particular aspect additional glue is applied to the coarse mesh layer, e.g. in at least one line on the coarse mesh layer or in a plurality of spaced-apart lines. The line(s) may be straight, curved, zig-zag, patterned, wavy, etc.

The present invention discloses, in at least certain aspects, methods for tightening screening material on screen assemblies for vibratory separators and shale shakers, the methods including applying heated moisture-curing hot melt glue in a glue pattern to layers of screening material useful for screening fluid introduced to a vibratory separator or shale shaker. Following curing of the glue, there are non-flat portions of screening material between cured lines, portions or beads of the glue. The glued-together layers are then epoxied to a tubular frame. Following curing of the epoxy (with the non-flat areas remaining between the cured glue lines), the resulting screen assembly is subjected to vibration while an aqueous fluid such as drilling fluid with drilled cutting thereon or hot water at a temperature higher than the ambient temperature around the vibratory device (separator or shaker) is introduced onto the topmost layer of screening material. Following such vibration and flowing of fluid, the non-flat portions of the screening material are flattened out. The screen assembly can then remain in use on the vibratory device for a desired time period.

The present invention discloses, in certain aspects, a screen assembly with a tubular frame having four tubular frame sides in a generally rectangular configuration with one crossmember or a plurality of spaced-apart crossmembers extending between the peripheral tubular frame sides. For effective emplacement of such a screen assembly on a shale shaker whose bed or deck has an upstanding member projecting above the bed or deck (e.g. a commercially available Cobra shale shaker), one or more (as required) of the crossmembers is notched or recessed to accommodate the upstanding member so that the screen assembly can lay flat on the bed or deck. The upstanding member projects into the notch, notches, recess, or recesses rather than abutting an unnotched, unrecessed part of the tubular crossmember and thereby preventing the screen assembly from laying flat on the deck or bed.

The present invention discloses, in at least certain embodiments, methods for tightening non-flat parts of glued together screening material combinations and such glued together screening material combinations, and screen assemblies with such a combination mounted on a tubular frame and secured thereto with epoxy.

The present invention, in certain aspects, discloses a screen assembly with layers glued together by, e.g., heated (then cured) moisture-curing hot melt glue, and methods for producing such glued screen assemblies.

The present invention, in one embodiment includes a shale shaker with a frame; a "basket" or screen mounting apparatus; one or more screens according to the present invention as described above and below; and basket vibrating apparatus.

The present invention discloses, in certain aspects, a screen made by methods for making screens and screen assemblies as disclosed herein for a vibratory separator.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide:

New, useful, unique, efficient, nonobvious methods for making screen assemblies for vibratory separators, screen assemblies made by such methods, and methods for using such screen assemblies;

New, useful, unique, efficient, non-obvious methods for tightening non-flat screening material on a screen assembly; screens with such tightened screening material; and methods for using such screens; and A shale shaker or vibratory separator with one or more such screens or screen assemblies.

Certain embodiments of this invention are not limited to any particular individual feature disclosed here, but include combinations of them distinguished from the prior art with their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a basis or creative impetus for designing other structures, methods and systems for carrying out and practicing the present invention. The claims of this invention should be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

BRIEF DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIGS. 1A and 1B are cross-section views of a screen assembly according to the present invention.

FIG. 3 is a cross-section view of a glue bead for screening material combinations according to the present invention.

FIG. 4C is an end view of one end of the screen assembly of FIG. 4A (and the opposing end is identical to that of FIG. 4C). FIG. 4D is a side view of one side of the screen assembly of FIG. 4A (and the opposing side is identical to that of FIG. 4C).

FIG. 5 is a perspective view of a shale shaker according to the present invention.

FIG. 7A is a side view and FIG. 7B is a front view of a heating apparatus.

DESCRIPTION OF EMBODIMENTS PREFERRED AT THE TIME OF FILING FOR THIS PATENT

FIG. 1A shows a glued-together screen combination 10 with lower coarse mesh 11 and upper fine mesh or meshes 12. Following the gluing operation and curing of the glue 13, portions of the upper mesh or meshes are rippled, wavy, or non-flat (as shown). Following mounting (by epoxy powder or by hot melt glue) of such a screen combination 10 to a tubular frame and then subjecting the resulting screen assembly to vibration on a vibratory shaker while fluid at a temperature above ambient temperature (e.g. at least five to twenty degrees hotter than ambient and including, but not limited to drilling fluids from a wellbore up to 160° F. or higher) is fed to the screen assembly, the non-flat portions of the screening material tighten and flatten, as shown in FIG. 1B.

FIG. 3 shows a cross-section or one glue bead's B profile applied to a screen S. The distance "a" is, in this embodiment, about one-sixteenth of an inch but may be any desired height as applied. Preferably the distance "b" is as thin as possible. Alternatively, the raised portion (all above the level "b") is deleted.

Figure 2A:
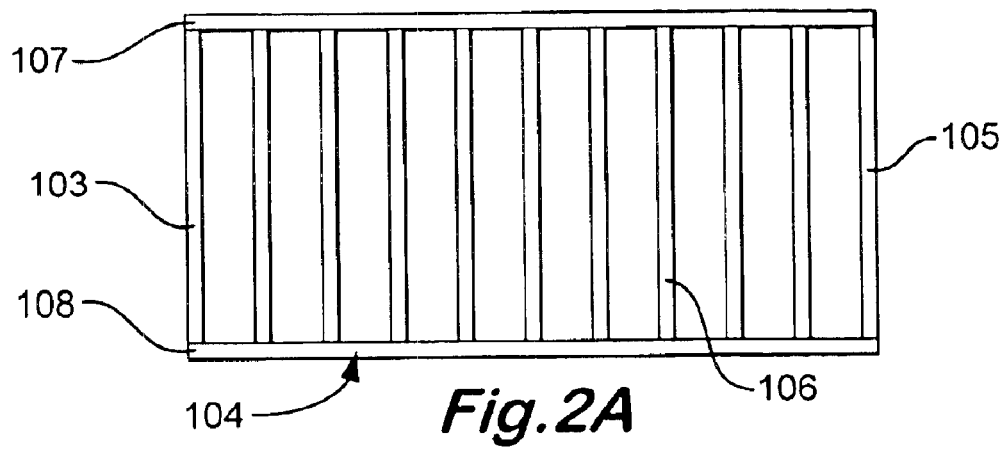
FIG. 2A is a top view of a frame for a screening assembly according to the present invention.
Figure 2B:
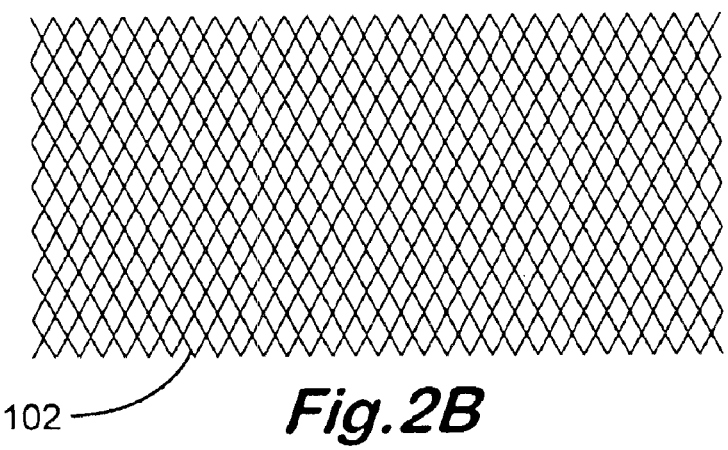
FIG. 2B is a top view of screening material for a screen according to the present invention.
Figure 2C:
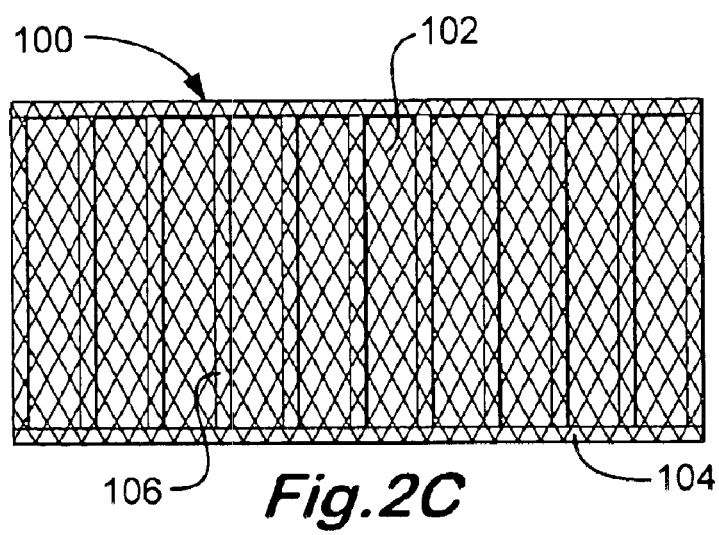
FIG. 2C is a top view of a screen assembly according to the present invention with a frame as in FIG. 2A and screening material as in FIG. 2B.

FIG. 2C shows a screen assembly 100 according to the present invention which has screening material 102 (FIG. 2B) secured onto a tubular frame 104 (FIG. 2A). In other aspects the frame 104 is deleted and a hookstrip (of any known shape and/or configuration) is connected to each of two spaced-apart sides of the screening material 102. The screening material is any multi-layer screen according to the present invention with two, three or more layers glued together as described herein with moisture curing hot melt glue according to the present invention. The multiple layers of glued together screening material 102 and the tubular frame 104 are encapsulated with a powdered epoxy in a semi-cured state and then the semi-cured powdered epoxy is heated, bonding the screening material to the frame 104. Following cooling, the cured powdered epoxy encapsulates the screen material, adjacent to the frame and the frame forming a unitary structure.

The tubular frame 104 has a plurality of crossmembers 106 that extend between and whose ends are connected to sides 107, 108 of the frame 104. End members 103, 105 are at the ends of the frame 104. In certain aspects there are nine crossmembers 106. The tubular frame 104 and its parts may be made of hollow or solids beams, tubes, bars, or rods of metal (e.g. steel, aluminum, zinc, stainless steel and/or alloys of any of these), plastic, or fiberglass. Metal and/or plastic parts may be welded together.

In one particular aspect the frame 104 is made of hollow square cross-section tubes 103, 104, 107, 108 with a 0.766 inch square cross-section and round cross-section tubes 106 with a 0.601 square inch cross-section. The screen assembly 100 (and the frame 104) may have any suitable desired length and width. In one aspect the screening material is made of strands of 304, or 316 stainless steel and the frame is made of carbon steel. In another aspect the crossmembers 106 and/or end members 103, 105 are made of tubular members with a circular, oval, or elliptical cross-section.

In one aspect the screening material is bonded to the frame with a powdered epoxy material. The frame is heated then dipped into a fluidized bed of the powder which completely encapsulates the frame in a semi-cured state and, in one particular aspect, with a thickness of about 35 mils. The frame and screening material are put on a heated platen with the screening material (in one case three layers 170× 105 mesh, 105×64 mesh and 19 mesh glued together with a method according to the present invention) below the frame. Upon heating to about 450 degrees F., the powdered adhesive is heated and flows down over the wires of the screening material. In one aspect the wires are partially coated and in another they are, preferably, completely encapsulated with the adhesive. The frame with the screening material on it is left on the heated platen until the coating is cured, being heated when it is curing. In one aspect the coating encapsulates the frame. Any glue bead pattern and application method described in the parent patent applications of this invention may be used according to the present invention.

FIGS. 4A–4F show a screen assembly 40 according to the present invention which has a tubular frame 42 with ends 44 and interconnected sides 45. A screening material combination 50 is bonded with epoxy powder to the tubular frame 42. A crossmember 41 (of a plurality of spaced-apart crossmembers 43 that extend between and have ends connected to the sides 45) has two notches 46 for receiving an upstanding member of a shale shaker deck.

In certain shale shakers in which screen assemblies without crossmembers such as the crossmember 41 are used, one or more upstanding members are used for proper screen assembly positioning or for stabilizing screen assemblies in position. Rather than removing such upstanding member(s), a screen assembly according to the present invention may be installed on such a shaker deck so that the upstanding member (which is perpendicular to the crossmember 41 as viewed from above or below) is received in and projects into one (or more) of the notches 46. With a screen assembly 40 as shown, the crossmembers 43 on either side of the crossmember 41 are sufficiently spaced-apart from the crossmember 41 that the upstanding member does not contact the adjacent crossmembers 43. Although only one notch 46 can accommodate an upstanding member, by using two notches 46, proper emplacement of the screen assembly 40 over the upstanding member is made "fool proof"—i.e. whichever side of the screen assembly is placed nearest the shaker's exit end (or fluid introduction end) one of the notches will be above the upstanding member. Of course it is within the scope of the present invention to place aligned notches on adjacent crossmembers to accommodate an upstanding member of length sufficient to extend beyond the distance separating two, three, four or more.

The screen assembly 40 as shown has a multi-layer combination 50 of layers of screening material glued together with moisture curing hot melt glue in a glue pattern 62. The multi-layer glued-together combination 60 is bonded to the tubular frame 42 with cured epoxy powder. As shown the screen assembly 40 has not yet been vibrated with fluid flowing onto it and areas 64 of screening material between glue lines is non-flat or rippled (as shown). Subjecting the screen assembly 40 to vibration and fluid flow according to the present invention will result, according to the present invention, in the tightening of the non-flat screening material in the areas 64.

Figure 4A:
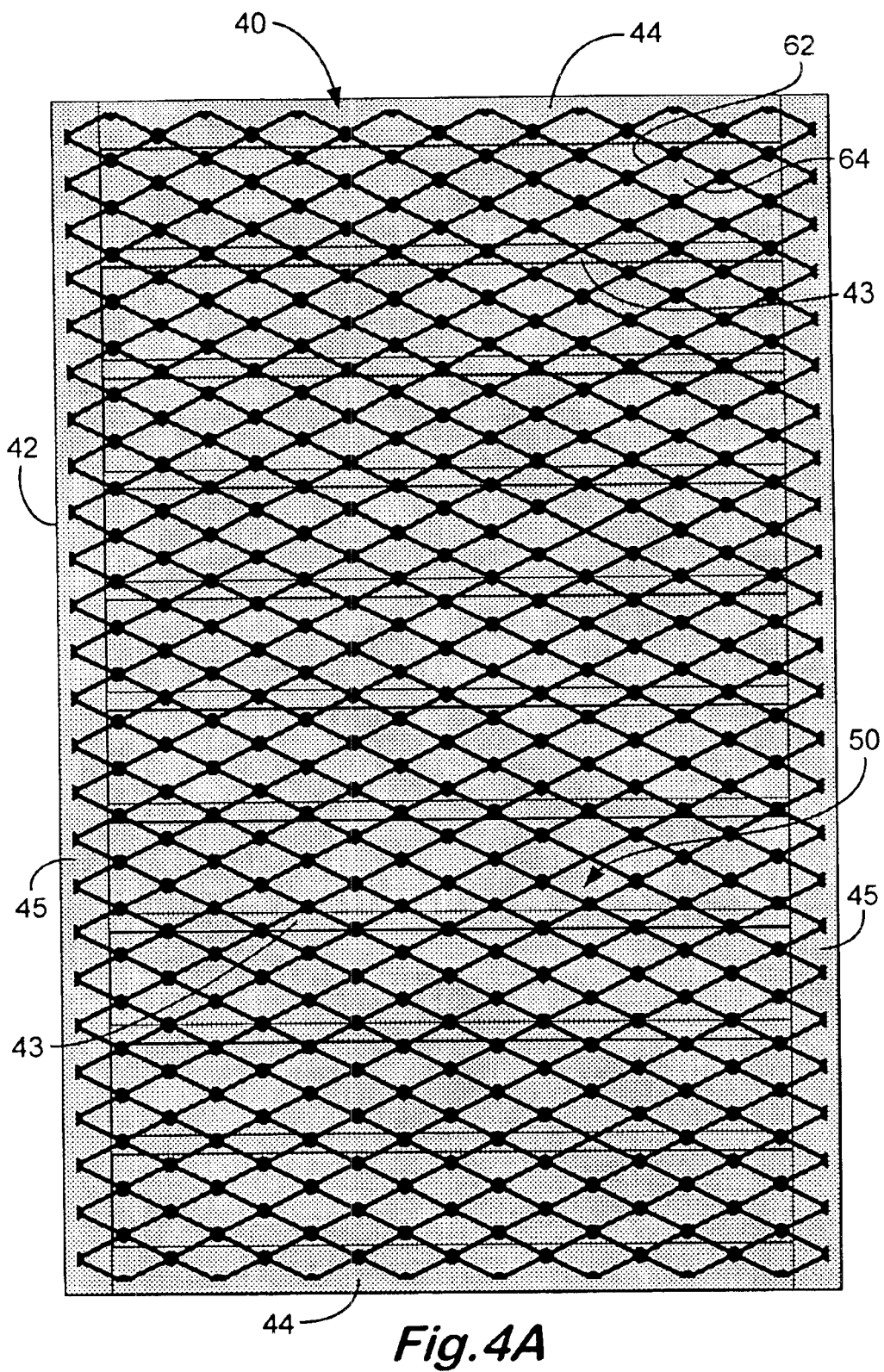
FIG. 4A is a top view of a screen assembly according to the present invention.
Figure 4B:
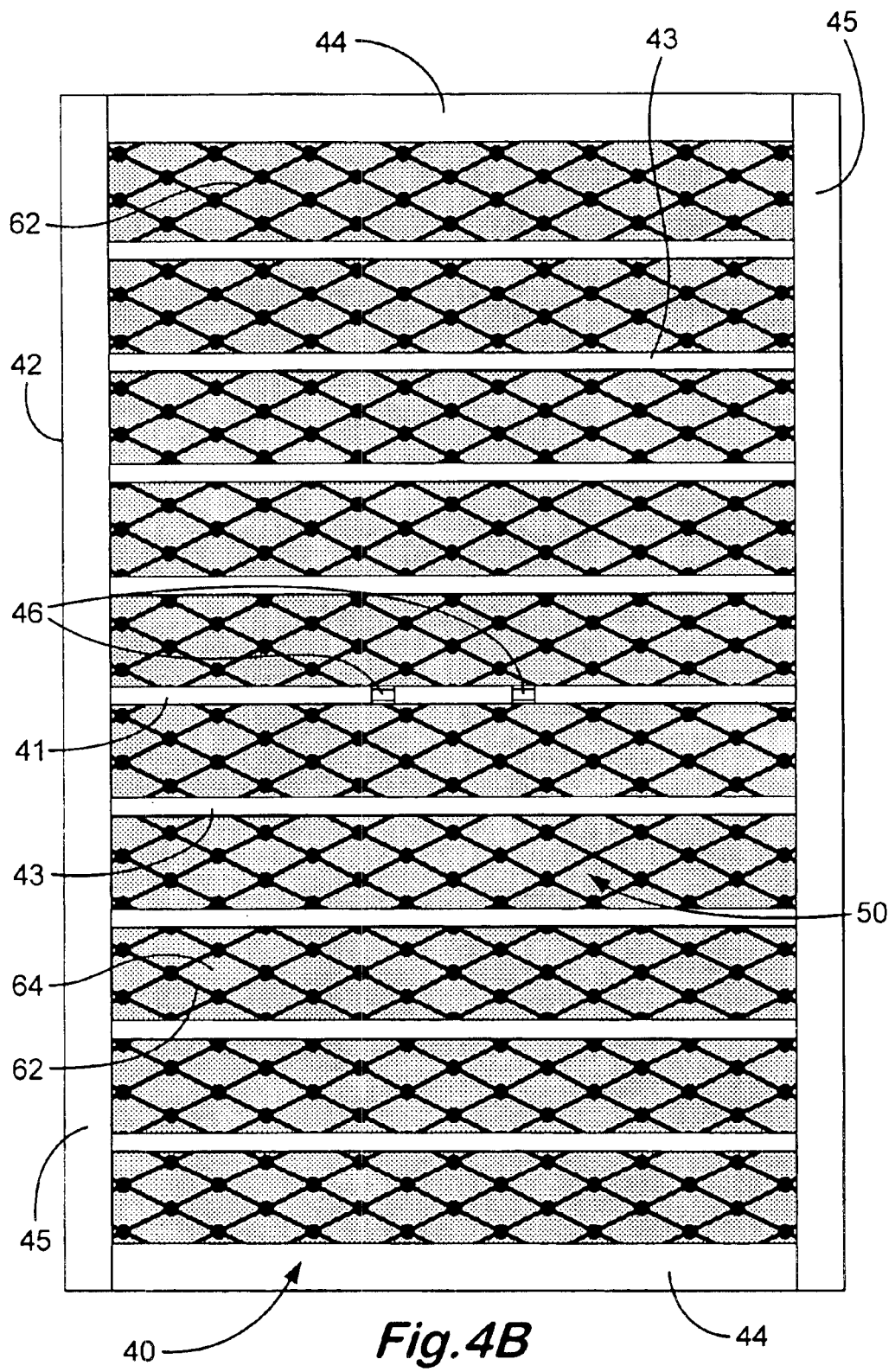
FIG. 4B is a bottom view of the screen assembly of FIG. 4A.
Figure 4E:
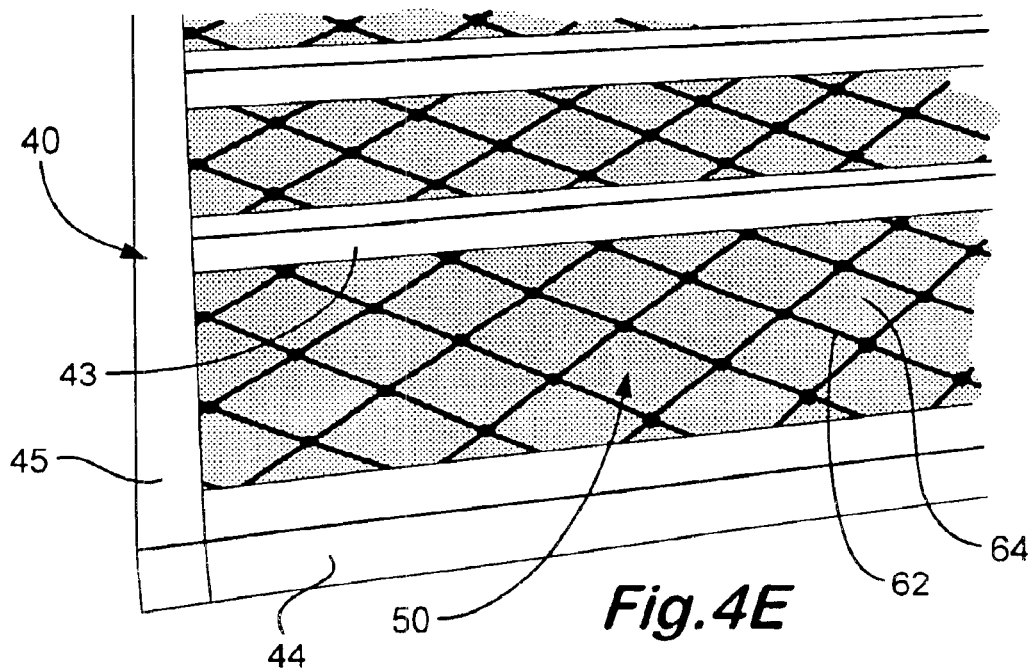
FIG. 4E is a partial bottom perspective view of the screen assembly of 4A.
Figure 4F:
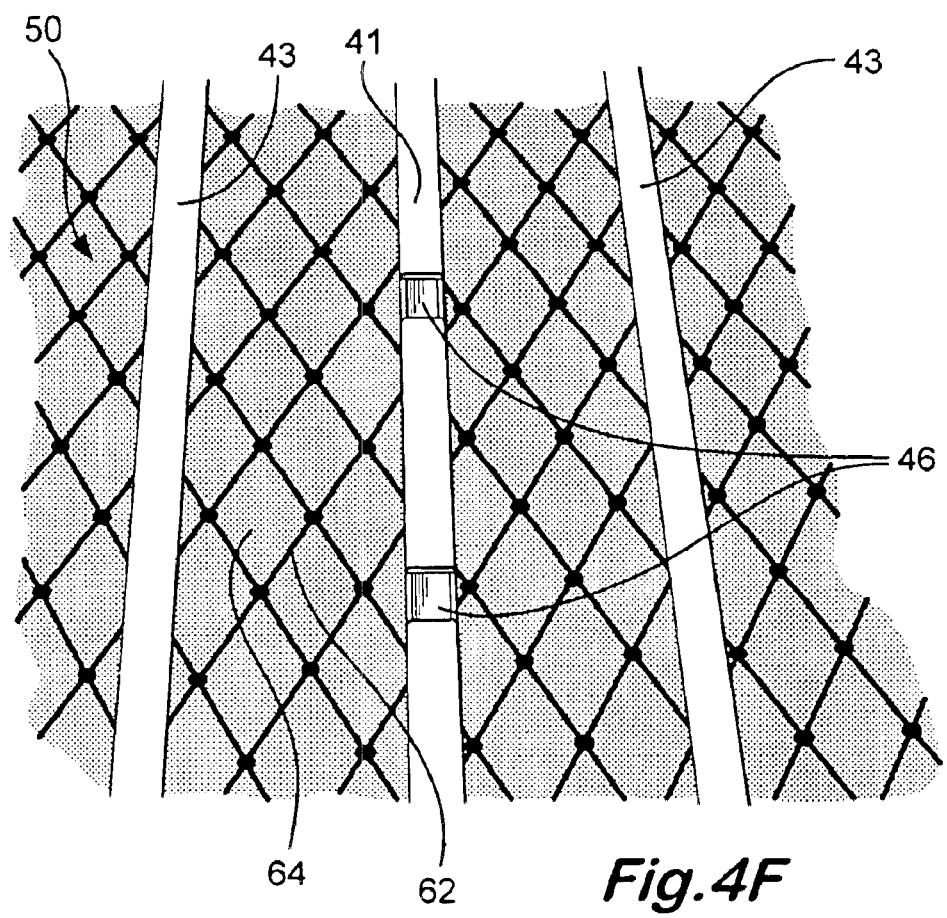
FIG. 4F is a partial bottom view of the screen assembly of FIG. 4A.

It is within the scope of the present invention to provide a screen assembly with a support for glued-together combination of multiple layers of screening material (e.g. any glued-together multi-layer combination disclosed herein or in parent patent applications of this invention) that is a perforated plate (instead of the tubular frame, e.g. instead of the tubular frame 14, FIG. 1B; the tubular frame 42, FIG. 4A; or the tubular frame 104, FIG. 2A). Any known perforated plate may be used. Such a screen assembly with a perforated plate is within the scope of the present invention with or without non-flat screening areas; and such a screen assembly may have spaced-apart side hookstrips for mounting in a shale shaker.

Tightening of non-flat screening areas (e.g. as in the screen assemblies of FIGS. 1A, 2A and 4A) may, according to the present invention, be facilitated by flowing fluid onto the screen assemblies that is above ambient temperature. In certain aspects the fluid temperature is between five degrees to twenty degrees above ambient temperature. Such a temperature may be achieved using any known heater apparatus and/or by pumping fluid, e.g., but not limited to, pumping fluid with the typical known fluid pumping apparatus associated with known shale shakers. In other aspects, when the fluid pumped onto the screen assemblies is drilling fluid from a wellbore being drilled, the drilling fluid having drilled cuttings, etc. therein, the fluid temperature may be between 120° F. and 160° F. or higher.

In one particular embodiment a screen assembly as in FIG. 4A was run on two commercially available King Cobra shale shakers for a total of about 96 hours with 16 pound oil-based drilling fluid with drilled cuttings and shale solids therein being treated by the screen assembly. Following this use the screening material areas which were non-flat were tightened. In another embodiment, a screen assembly as in FIG. 4A was run on a King Cobra shaker for 120 hours and fluid slightly above ambient temperature (e.g. four to twelve degrees F. above ambient) was fed to the screen assembly, the fluid weighing about nine pounds per gallon and containing sand, water, and bentonite (by weight, about 92% water, 4% sand and 4% bentonite). Following this use screening material areas that were non-flat were tightened.

It is within the scope of this invention to tighten non-flat screening material areas between glue lines of a multi-layer screening material combination of a screen assembly by vibrating the screen assembly for a sufficient time period on a shale shaker while feeding fluid thereto at a sufficiently high temperature to effect tightening of the non-flat areas. Such fluid may or may not contain drilled cuttings, sand, and/or other solids.

In one method according to the present invention a multi-layer screen with three layers of screening mesh (any disclosed or referred to herein) is produced by a glue machine or apparatus as any according to the present invention and/or as described above (and including, but not limited to, as any machine disclosed in any application or patent listed in the Related Applications section above) with any glue and any glue pattern disclosed or referred to herein (e.g. in one aspect including, but not limited to, any glue pattern disclosed in any application or patent referred to in the Related Application section above using hot melt glue). In one particular aspect such a multi-layer screen has a coarse layer, a first fine layer on top of the coarse layer, and a second fine layer on top of the first fine layer. Following cooling of this multi-layer screen and prior to securing it to a frame, plate, or other support, the multi-layer screen is placed in a heated platen whose area is at least as large as the area of the multi-layer screen and, in one aspect, at least slightly larger than the area of the multi-layer screen.

The multi-layer screen is then heated in the heated platen to effect: flattening out of non-flat or "puffy" areas of screen mesh; flattening of non-flat areas of glue; and/or to improve glue encapsulation, especially at intersections of wires of the screening material layers. Such heating of the wires of the screening layers causes the wires to expand and to elongate; results in a more uniform distribution of glue between the layers; and makes a more flush top-mesh/glue surface at glued areas facilitating solids conveyance over these areas, thus reducing, inhibiting, and/or preventing the abrasion of screening material by solids that contact an upwardly projecting amount of cured glue and move and rotate in place rather than flowing over and past the amount of cured glue. Care is taken not to burn the glue. In one aspect such a multi-layer screen (with a coarse mesh layer between 15 and 25 mesh and in one particular aspect of 19 or 20 mesh; a middle layer between 140 to 170 mesh; and a top layer between 170 to 250 mesh) is heated in the heated platen for between 0.5 to 5 minutes (in one aspect, about 1–5 minutes) at a temperature of about 400° F. In one particular aspect, the coarse mesh is 19 mesh, the middle layer is 160 mesh, and the top layer is 180 mesh—all of stainless steel wire. The resulting screen panel with the coarse mesh layer and the two finer mesh layers is then mounted on a frame or plate or side hookstrips are applied to it. Any suitable known coarse mesh and fine meshes may be used. Optionally, only one fine mesh layer is used.

In one method according to the present invention a roll of layered screen material is produced by a glue machine or apparatus (as any according to the present invention, as any described above and/or as referred to herein), the screen with two layers of screening material. In one aspect, the two layers range between 30 and 250 mesh; in one aspect one layer is between 30 and 200 mesh and the other layer is between 50 and 300 mesh; and in one particular aspect one layer is 160 mesh and the other is 180 mesh—both mesh layers of stainless steel wire. Following curing (e.g. cooling and/or setting, about e.g. for a time period from one day to about seven days), the roll of screen material is cut into pieces of desired dimensions, and then the pieces of two glued-together layers (glued with hot melt glue in any pattern disclosed or referred to herein) are placed in a heated platen (e.g. for 30 seconds to a minute, and, in one aspect, for 45 seconds) at about 400° F. to soften the glue to elongate the wire meshes and permit their uniform expansion, to flatten out glue, and to flatten out "puffy" areas. This improves encapsulation of the wires of the screen layers. Following this heating of the two-layered combination they are placed (in the pre-heated condition) on the bottom base of a heated platen and a layer of coarse mesh (e.g. between 18 to 30 mesh and in one aspect 20 mesh) is placed on top of them. A frame (or plate) previously coated with adhesive material, e.g. but not limited to, powdered epoxy material, is then placed on top of the coarse mesh. One or more lines of glue are on the coarse mesh layer (lengthwise, widthwise, curved and/or in any known pattern or spacing). The heated platen's top member is then lowered down onto the frame. By heating these components in this manner, the three mesh layers are glued together and the frame (or support) is adhered to the mesh layers. Preferably, at least some of the wires of the coarse mesh layer and/or of the two screening material layers are encapsulated in the powdered adhesive. Pre-heating the two fine mesh layers prior to bonding them to the coarse layer having lengthwise glue lines and then bonding the resulting screen panel to an epoxy-coated frame produces a screen assembly with a relatively flat surface at areas of gluing; improves glue encapsulation of wires of the meshes; reduces solids abrasion of the fine screen layers; and produces mesh layers tensioned based on their physical properties (e.g. wire diameter, wire material). Optionally, the two layers of screening material and the coarse mesh layer with one or more glue lines are all three preheated together.

Any suitable glue (in one aspect, a heat activated glue that is quick curing), epoxy, or adhesive (although these are not equivalents of each other) may be used to adhere the frame to the mesh layers. The frame (or support) may be adhered over substantially all its area to the coarse mesh layer and there may also be adherence to one or both of the other screening material layers depending on the epoxy, glue or adhesive used and on its amount. In one particular aspect the frame (or support) is heated and then coated (e.g. in a fluidized bed or with a spray system) with epoxy powder as described herein (or according to any method for such coating as is well known in the prior art) and the epoxy powder is only partially or semi-cured. Any suitable epoxy material known in the prior art may be used. In one particular aspect one, two, three, four or more glue beads (any disclosed herein) are applied lengthwise and/or across the width of the coarse mesh layer (e.g. in any pattern and by any glue machine or glue apparatus according to the present invention, disclosed herein, or referred to herein) prior to its imposition on top of the two already glued-together mesh layers.

In those embodiments in which a three layered screen panel—lowermost coarse mesh beneath two fine mesh layers—is preheated prior to its connection to a frame, plate, or support, wires of the two fine meshes expand and elongate more than the wires of the coarse mesh layer. For example, with a top mesh layer of 180 mesh made of wire 0.0012" in diameter; a middle mesh layer of 160 mesh with wire of 0.0014" diameter; and a coarse mesh layer of 20 mesh with wires of 0.0065" diameter, the finer mesh wires elongate more and more quickly than do the wires of the coarse mesh layer. Thus it is preferred for such an embodiment that the pre-heat time (prior to imposition of a frame, etc.) be sufficient to allow the wires of the coarse mesh to elongate to the same extent as the wires of the fine meshes. Optionally, following imposition of the epoxy-coated frame on the coarse mesh layer, the cure of the epoxy can be accelerated (e.g. with cure accelerator materials and/or by mechanical cooling apparatus) to prevent the coarse mesh wires from returning to their original size. If the cure is not rapid enough, quick contraction of the coarse mesh wires can crack the epoxy and result in a loss of desired tension in the finer meshes. In one aspect the wire diameter of the coarse mesh wires is at least three times that of the wire diameter of the fine mesh wires and in one particular aspect at least four times.

Also, the present inventors have found that the addition of adhesive promoter materials and/or particles of color pigment (e.g. red pigmentation material) to epoxy material to produce a hardened epoxy bond on a frame, support, or screen assembly, can result in undesirable cracking and non-uniform curing of the epoxy material. Preheating a combination of screen layers and a support together can also result in undesirable cracking. Such cracking and non-uniformity is reduced by using a method as described above in which a frame with epoxy material in a semi-cured state is placed with layers of screening material and then these components are heated as described, e.g. in a heated platen apparatus. In one particular aspect of such a method to produce such a screen assembly, a two layer screen with a layer of 160 mesh and a layer of 180 mesh, both stainless steel wire meshes, is produced by a glue machine according to the present invention with a glue pattern according to the present invention, e.g., but not limited to, as in FIG. 4A or as disclosed in pending U.S. application Ser. No. 10/037,474 filed Oct. 19, 2001 or in the Applications listed above in the Related Applications section. The two layer combination is heated in a heated platen at about 400° F. for about half a minute. A layer of coarse mesh (20 mesh, stainless steel) with one, two or more lengthwise glue beads (in one aspect, four equally spaced-apart glue beads from one side to the other, straight or in a curved shape as viewed from above; and in one aspect a plurality of glue beads about 3 1/16" apart or about 1 11/32" apart) (produced by a glue machine according to the present invention) is placed on top of the two pre-heated finer mesh layers in a heated platen and a tubular frame made of carbon steel with four sides and a plurality of crossbars (e.g., but not limited to, nine spaced-apart) is placed on top of the coarse mesh, the tubular frame coated with semi-cured epoxy material, e.g., but not limited to as described in U.S. Pat. Nos. 6,267,247; 6,290,068; and 5,876,552, all incorporated fully herein for all purposes. The platen is closed and the components are heated at about 400° F. for about 10 to 18 minutes. The resulting screen assembly is removed from the platen and allowed to cool. Optionally, only one fine mesh layer is used. Optionally, heating and/or preheating for any step of any method herein can be accomplished in an oven.

FIGS. 7A and 7B show a heated platen apparatus for use in methods described above with an upper movable heatable member 91 and a tray, bed or support 92 on which screen assembly layers and frame (or plate) are positioned. The member 92 is movable by a moving apparatus 93 shown schematically in FIGS. 7A and 7B. Alternatively, the tray 92 can be heated with or without heating the member 91.

The glue of the glue lines or beads placed on a lower coarse mesh provides a barrier that prevents the migration of solids across the screen assembly between the coarse mesh layer and the fine mesh layer above the coarse mesh layer. For example, if a hole is made in the upper fine mesh layers permitting solids to flow through them, such solids can move across the screen assembly on top of the coarse mesh layer (beneath the fine mesh layers) causing additional damage. A glue line or bead on the coarse mesh layer acts as a barrier to the movement of such solids. In certain aspects these glue beads are generally oval, circular, or generally semi-oval or semi-circular in cross-section with a diameter or height between 1/8" and 3/16". In certain aspects glue in a pattern or series of beads on the two fine mesh layers is between 1/16" to 1/8" in height or diameter.

Referring now to FIG. 5, a shale shaker 210 according to the present invention has a screen assembly 220 (with screen or screening cloth or mesh as desired) according to the present invention mounted on vibratable screen mounting apparatus or "basket" 212. The screen assembly 220 may be any screen assembly disclosed herein or have any combination of any feature or features of any screen, screen assemblies or screen part disclosed herein according to the present invention; and any such screen may be used with any appropriate known shaker or screening apparatus including, but not limited to, a vibratory separator like the shale shaker 210. The basket 212 is mounted on springs 214 (only two shown; two as shown are on the opposite side) which are supported from a frame 216. The basket 212 is vibrated by a motor 202 and interconnected vibrating apparatus 218 which is mounted on the basket 212 for vibrating the basket and the screens. Elevator apparatus 208 provides for raising and lowering of the basket end. The screen assembly 220 may be any screen assembly disclosed herein according to the present invention.

Figure 6:
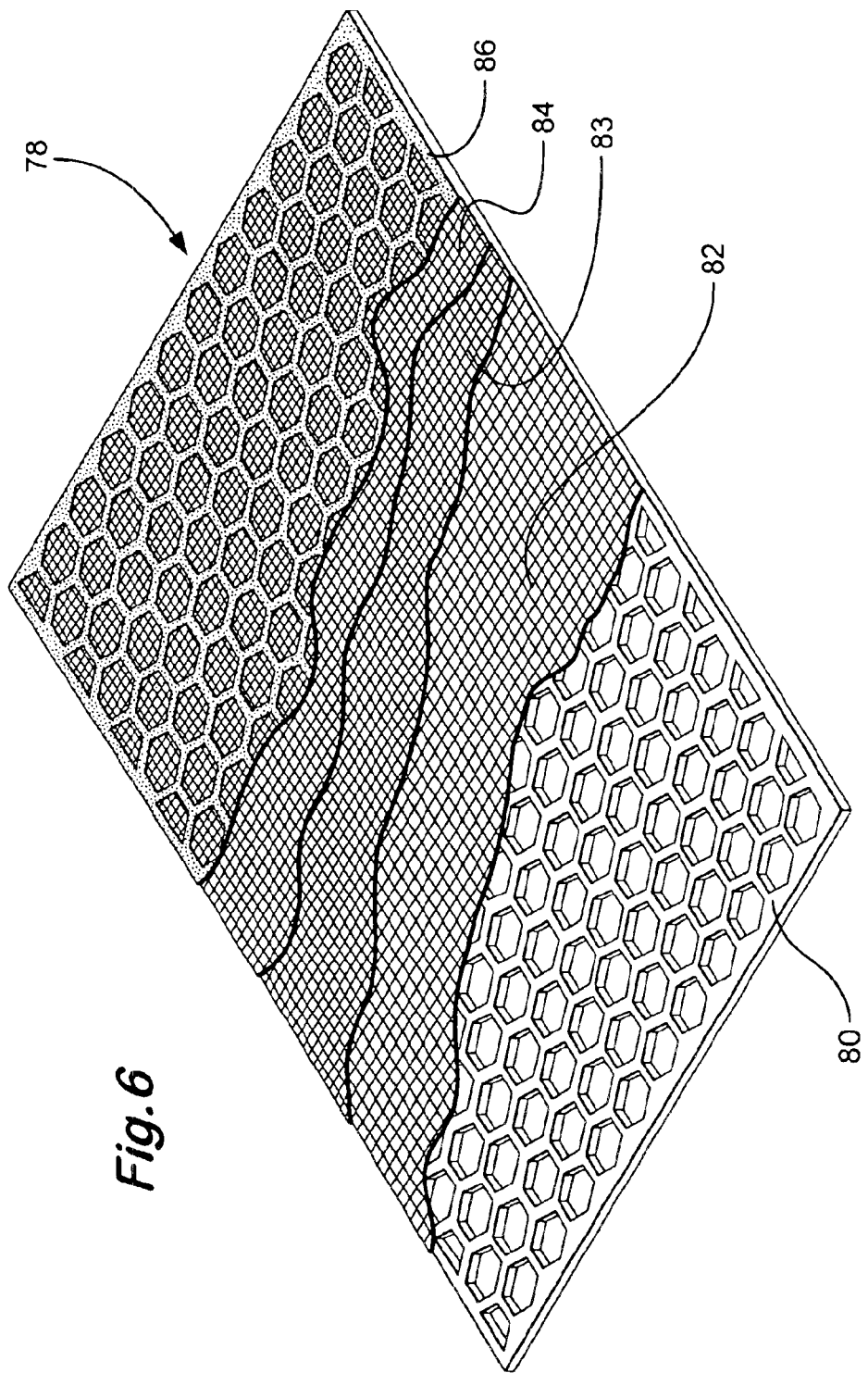
FIG. 6 is a perspective view of a screen assembly according to the present invention.

FIG. 6 shows a screen assembly 78 according to the present invention (shown with various layers partially cut away but which extend across the surface of the screen assembly) made by a method according to the present invention as described above wherein the two upper fine mesh layers are screening material layers 83 and 84; the coarse mesh layer is layer 82; the support is a perforated plate 80 which is initially coated with epoxy 86 which upon curing, assumes a pattern like that of the openings of the perforated plate 80. Optionally either layer 83 or 84 may be deleted (thereby eliminating the step of gluing two fine mesh layers together).

Figure 8A:
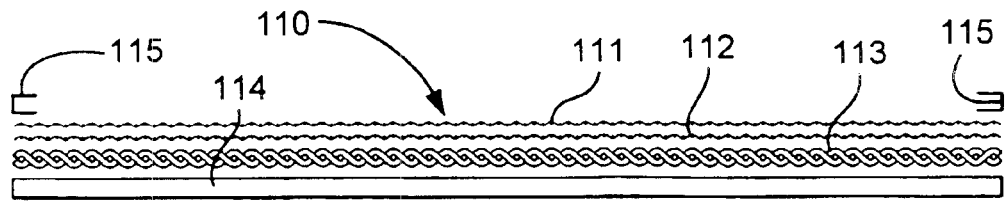
FIG. 8A is an end exploded view of a screen assembly according to the present invention.
Figure 8B:
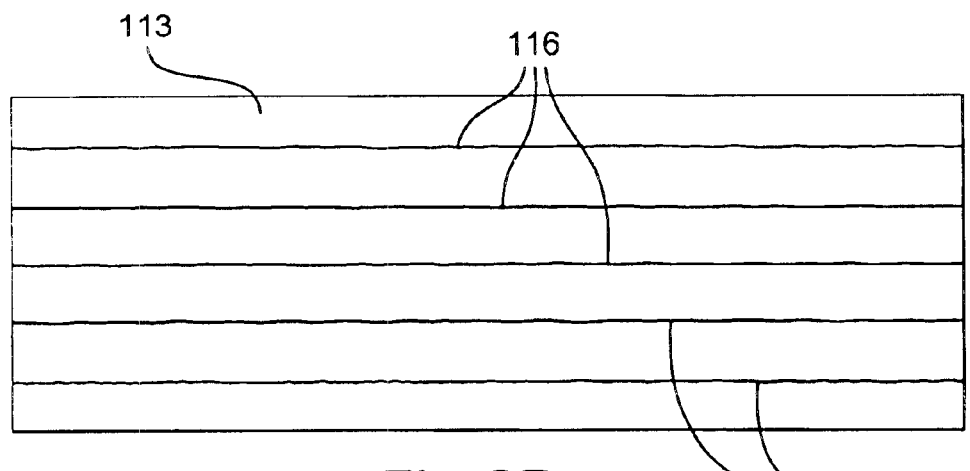
FIG. 8B is a top view of a coarse mesh layer of the screen assembly of FIG. 8A.
Figure 8C:
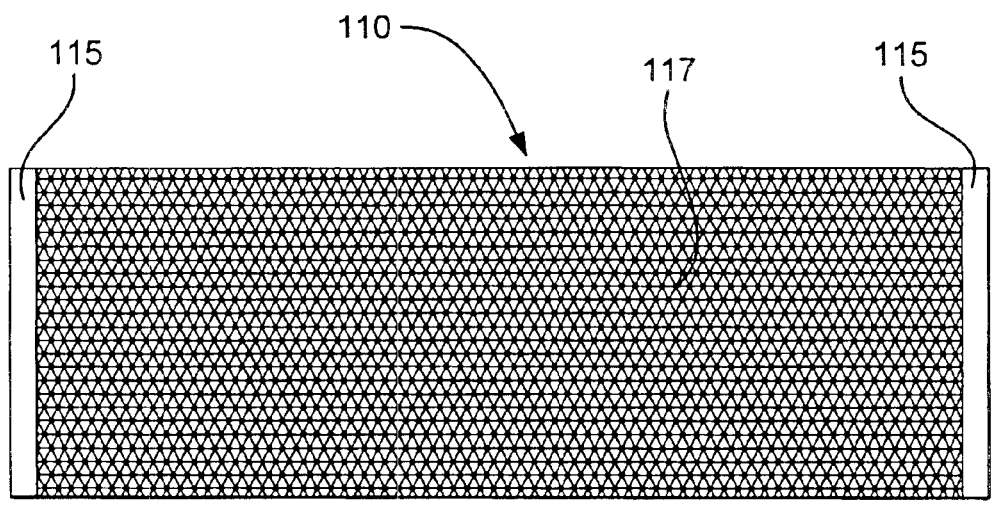
FIG. 8C is a top view of the screen assembly of FIG. 8A.

FIGS. 8A–8C show a screen assembly 110 according to the present invention which has two upper screening layers 111, 112 made of fine screening material; a coarse mesh layer of screening material 113; and a perforated plate support 114. Hookstrips 115 extend along opposed sides of the screen assembly 110. The hookstrips 115 are shown as "C" shaped, but it is within the scope of this invention to use any known hookstrip shape or configuration. Any known fine screening mesh and coarse mesh may be used for the layers 111, 112 and 113, respectively, including, but not limited to, those described or referred to above. Any suitable known plate may be used for the plate 114.

FIG. 8B shows a plurality of glue beads 116 extending across the coarse mesh layer 113 (the actual mesh and weave of the coarse mesh layer is not shown in FIG. 8B). Any desired number of beads 116 may be used from one to seven or more. Optionally, the beads extend lengthwise (from top to bottom in FIG. 8B) rather than across the coarse mesh layer. Optionally a pattern of beads that intersect is used on the coarse mesh layer, including, but not limited to, in any pattern disclosed or referred to herein. FIG. 8C illustrates a glue pattern 117 of glue that glues together the two upper screening layers 111, 112 and it is within the scope of this invention to use any desired glue pattern, including, but not limited to those described or referred to herein. Optionally, the plate 114 is deleted. Optionally, the plate 114 and hookstrips 115 are deleted and a frame or strip support is used. Optionally the plate 114 is deleted and a strip support is used.

The present invention, therefore, provides in at least certain embodiments, a method for making a screen assembly for a vibratory separator, the method including gluing together with glue at least two layers of fine screening material, allowing the glue to set, preheating the glued-together at least two layers of fine screening material, placing the thus-preheated at least two layers of fine screening material in a heating apparatus, placing a coarse mesh layer on the at least two layers of screening material on the heating apparatus, placing on the coarse mesh layer a support with heat activated material thereon for adhering the support to the coarse mesh layer, and heating the coarse mesh layer, at least two layers of fine screening material, and the support to adhere the support to the coarse mesh layer and to glue the at least two layers of fine screening material to the coarse mesh layer. Optionally, the coarse mesh layer is preheated with the layers of screening material. Such methods may have one or some (in any possible combination) of the following: wherein the glue is moisture-curing hot melt glue; wherein glue gluing together the at least two layers of fine screening material glues together the coarse mesh layer and the at least two layers of fine screening material; applying additional glue to the coarse mesh layer; wherein the additional glue is applied in at least one line or bead on the coarse mesh layer; wherein the at least one line or bead is at least two spaced-apart lines; wherein the at least one line or bead is applied lengthwise on the coarse mesh layer; wherein the at least one line or bead is applied in an amount sufficient to effect a barrier to solids migration between the coarse mesh layer and a lowermost layer of the at least two layers of fine screening material, said lowermost layer adjacent the coarse mesh layer; wherein the at least two layers of fine screening material are glued together by applying a pattern of glue lines or beads to at least one of said layers with a glue application apparatus; wherein the at least two layers of fine screening material are made of a plurality of interwoven wires and wherein the preheating is sufficient to effect elongation of the wires of the at least two layers of fine screening material and, in one aspect, uniform elongation; wherein the coarse mesh layer ranges between 15 mesh and 25 mesh; wherein the at least two layers of fine screening material includes a first layer and a second layer; wherein the first layer ranges between 30 mesh and 200 mesh and the second layer ranges between 50 mesh and 300 mesh; wherein the glued together at least two layers of fine screening material are preheated for between thirty and sixty seconds; wherein the support is a frame; wherein the heat activated material is epoxy adhesive; wherein following adhering of the coarse mesh layer to the support hardening or cure of the epoxy adhesive is accelerated; wherein the at least two layers of fine screening material and the coarse mesh layer are made of interwoven wires and wires of the coarse mesh layer have a diameter at least three times a diameter of wires of the at least two layers of fine screening material.

The present invention, therefore, provides in at least certain embodiments, a method for separating components of a fluid, the method including introducing the fluid to a vibratory separatory, the vibratory separatory comprising a screen assembly mount, vibrating apparatus for vibrating the screen assembly mount, and a screen assembly mounted to the screen assembly mount, the screen assembly made by a method according to the present invention, and vibrating the screen assembly mount thereby vibrating the screen assembly as the fluid is fed onto the screen assembly.

The present invention, therefore, provides in at least certain embodiments, a screen assembly made by a method according to the present invention.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A method for making a screen assembly for a vibratory separator, the method comprising
    applying glue to at least two layers of fine screening material,
    allowing the glue to set so that the at least two layers of fine screening material are glued together,
    preheating the glued-together at least two layers of fine screening material,
    placing the thus-preheated at least two layers of fine screening material in a heating apparatus,
    placing a coarse mesh layer on the thus preheated at least two layers of screening material in the heating apparatus,
    placing on the coarse mesh layer a support with heat activated material thereon for adhering the support to the coarse mesh layer, and
    heating the coarse mesh layer, the at least two layers of fine screening material, and the support to adhere the support to the coarse mesh layer and to glue the at least two layers of fine screening material to the coarse mesh layer.

2. The method of claim 1 wherein the glue is moisture-curing hot melt glue.

3. The method of claim 1 wherein the glue glues together the coarse mesh layer and the at least two layers of fine screening material.

4. The method of claim 1 wherein the at least two layers of fine screening material are glued together by applying a pattern of glue beads to at least one of said layers with glue application apparatus.

5. The method of claim 1 wherein the at least two layers of fine screening material are comprised of a plurality of interwoven wires and wherein the preheating is sufficient to effect elongation of the wires of the at least two layers of fine screening material.

6. The method of claim 1 wherein the coarse mesh layer range between 15 mesh and 25 mesh.

7. The method of claim 1 wherein the glued together at least two layers of fine screening material are preheated for between thirty and sixty seconds.

8. The method of claim 1 wherein the support is a frame.

9. The method of claim 1 wherein each of the at least two layers of fine screening material are comprised of interwoven wires, the coarse mesh layer is comprised of interwoven wires, and wires of the coarse mesh layer have a diameter at least three times a diameter of wires of the at least two layers of fine screening material.

10. The method of claim 1 wherein the at least two layers of fine screening material comprises a first layer and a second layer.

11. The method of claim 10 wherein the first layer ranges between 30 mesh and 200 mesh and the second layer ranges between 50 mesh and 300 mesh.

12. The method of claim 1 wherein the heat activated material is epoxy adhesive.

13. The method of claim 12 wherein, following adhering of the coarse mesh layer to the support, cure of the epoxy adhesive is accelerated.

14. The method of claim 1 further comprising
applying additional glue to the coarse mesh layer.

15. The method of claim 14 wherein the additional glue is applied in at least one line on the coarse mesh layer.

16. The method of claim 15 wherein the at least one line is at least two spaced-apart lines.

17. The method of claim 15 wherein the at least one line is applied lengthwise on the coarse mesh layer.

18. The method of claim 17 wherein the at least one line is applied in an amount sufficient to effect a barrier to solids migration between the coarse mesh layer and a lowermost layer of the at least two layers of fine screening material, said lowermost layer adjacent the coarse mesh layer.

* * * * *